Patented Apr. 28, 1953

2,636,866

UNITED STATES PATENT OFFICE 2,636,866

POLYVINYL CHLORIDE PLASTICIZED WITH ISOBUTYLENE - DIOLEFIN - ACRYLONITRILE COPOLYMER

Fred W. Banes, Westfield, David W. Young, Roselle, and Alta J. Hund, Linden, N. J., assignors to Standard Oil Development Company, a corporation of Delaware No Drawing. Application June 29, 1949, Serial No. 102,164

4 Claims. (Cl. 260—23.7)

This invention relates to oil-resistant and light-stable plastic blends and more particularly to vinyl resins and other resinous materials plasticized with a tripolymer of a diolefin, and acrylic nitrile and isobutylene.

Two-component copolymers of a conjugated diolefin such as butadiene with acrylonitrile containing 15 to 60% of the latter component have been known previously in the form of rough, rubbery products having relatively poor extrusion characteristics as well as imperfect heat and light stability. These prior art copolymers have been used fairly extensively as plasticizers for vinyl chloride polymers or copolymers and similar vinyl resins, as far as the previously described disadvantages inherent in the prior art nitrile polymers permitted. Similarly, the preparation of two-component copolymers of isobutylene with a major proportion of acrylonitrile has been suggested previously, but the resulting copolymers normally were brittle resins having melting points close to their degradation temperature and therefore unsuited for extrusion unless the molecular weight was kept low during polymerization by means of relatively large amounts of mercaptan modifiers under conditions described in copending U. S. patent application Serial No. 794,434, filed December 29, 1947, now Patent 2,621,170. Furthermore, the prior art copolymers of isobutylene and acrylonitrile were rather completely saturated and hence incapable of vulcanization or other chemical modification based on the reactivity of unsaturated linkages.

Tripolymers of butadiene, methacrylonitrile and one or more butenes have also been known in the form of rubbery, non-thermoplastic products characterized by great elongation and low tensile strength in the absence of vulcanization. Tripolymers of other monomers including various combinations of butenes, butadiene, acrylonitrile, styrene, methyl methacrylate and the like have also been suggested previously.

It has now been discovered that when isobutylene, acrylonitrile and butadiene or equivalent monomers are copolymerized simultaneously in aqueous emulsion in certain specified proportions, a new plastic material is obtained which possesses an unexpected combination of useful characteristics. In particular, the resulting three-component polymers are flexible, oil-resistant, resinous, thermoplastic, easy to process, are transparent or have very light color, and are surprisingly resistant to heat, light and various other physical and chemical effects despite their substantial unsaturation. Conversely, the unsaturation of the novel plastics allows the latter to be readily vulcanized or otherwise chemically modified by methods previously applied to diolefinic polymers. The tough, flexible products of the invention can be used by themselves for the formation of clear, self-supporting films or sheets of any desired thickness, flexible tubing, tank-car lining, paper coating and other uses.

Furthermore, since the plasticity of the novel polymers may be adjusted during their synthesis, it is unnecessary to employ plasticizing agents in preparing the polymers for the aforementioned uses. This is particularly advantageous since the use of plasticizing agents has been considered virtually mandatory with almost all plastics known heretofore, whereby the cost of manufacturing has been necessarily increased and at the same time the incorporation of plasticizing agents in the plastic usually brought about at least a partial sacrifice in some of the properties otherwise inherent in the plastic itself. Of course, though plasticization of the novel plastics is usually superfluous, many of the common plasticizers are compatible with the plastics and may be compounded therewith if desired. Fillers coloring materials, curatives, anti-oxidants and other agents known to be used with resinous or vulcanzable rubber-like materials can also be employed in conjunction with the novel plastics.

Finally, the new plastics themselves are exceptionally well adapted for use as plasticizers for other types of resins, notably for vinyl chloride polymers such as polyvinyl chloride, polyvinyl acetate, copolymers of about 85 to 95% polyvinyl chloride and about 15 to 5% of vinyl acetate; or for polyvinylidene chloride, polyvinyl alcohol, polyvinyl butyral, polystyrene, the various phenolics, alkyd, melamine and other resins. As plasticizers, the tripolymers described herein are quite surprisingly superior to the diolefin-nitrile copolymers of the prior art.

The polymers useful in practicing the present invention are prepared by copolymerizing in aqueous emulsion a conjugated diolefin of 4 to 6 carbon atoms such as butadiene, isoprene, piperylene or dimethyl butadiene, and an isoalkene having 4 to 8 carbon atoms per molecule such as iso-amylene, 2,4,4-trimethyl ethylene-1, or preferably isobutene together with acrylonitrile or an alpha substituted acrylic nitrile such as methacrylonitrile, chloracrylonitrile, or other similar nitriles having the formula $CH_2:CR.C:N$ wherein R may be selected from the group consisting of hydrogen, methyl and chlorine. Mixtures of monomers of each of the aforedescribed classes can also be used in place of the individual compounds. The polymers of the invention usually have compositions lying in the following range: diolefin, 20 to 40 weight percent; isoalkene, 5 to 25 weight percent; and nitrile, 45 to 60 weight percent. Such compositions can be conveniently obtained from monomer feeds containing about 15 to 30 weight percent of diolefin, 30 to 60 weight percent of isoalkene and 25 to 60 weight percent of nitrile. Products possessing an especially good combination of mechanical and thermoplastic properties can be obtained from feeds containing 15 to 25 percent of butadiene, 30 to 45 percent of isobutylene and 35 to 50 percent of acrylonitrile, and the resulting resins are particularly outstanding as softeners for polyvinyl chloride or for vinyl chloride-vinyl acetate copolymer resins.

The three-component polymers are prepared by emulsifying the above-described monomer feed in an aqueous medium, the weight ratio of monomers to water being from about 2:1 to about 1:10, ratios between 1:2 and 1:4 being usually preferred. As emulsifier, it is desirable to use about 1 to 10 weight percent (based on monomers) of a detergent emulsifier of the formula $RSO_3M$ wherein R is selected from the class consisting of alkoxy radicals having 8 to 18 carbon atoms, alkyl radicals having 12 to 30 carbon atoms and alkyl-substituted phenyl or naphthyl radicals having 12 to 30 aliphatic carbon atoms in an alkyl group, and wherein M is an alkali atom such as sodium or potassium or an ammonium radical. For example, the emulsifier may be an alkyl sulfate such as potassium octyl sulfate, or ammonium octadecyl sulfate; or an alkyl sulfonate such as potassium lauryl sulfonate or sodium triacontyl sulfonate; or an alkyl aromatic sulfonate such as the sodium salt of dodecyl benzene sulfonic acid. In general high emulsifier concentrations tend to favor the formation of copolymers of high plasticity and correspondingly enhanced processability.

Of the aforementioned types of emulsifiers the alkyl sodium sulfates having 12 to 16 carbon atoms such as sodium lauryl sulfate or sodium cetyl sulfate have been found particularly favorable to the course of the desired reaction. On the other hand, ordinary soaps such as sodium oleate are useful, but much less desirable.

In addition to the previously mentioned ingredients the reaction mixture also contains about 0.3 to 2 or 5 weight percent (based on monomers) of a per-type catalyst exemplified by persulfates or perborates of sodium, potassium or of ammonium. Alternatively, peroxides such as hydrogen peroxide or benzoyl peroxides may also be used, provided that the system is duly activated by the well-known redox-type recipes or the like. The yield is increased somewhat by increasing the catalyst concentration, whereby a further improvement in processability is obtained because of a concomitant decrease in intrinsic viscosity. However, balancing the desire to have an easily processable polymer against the desire to obtain a plastic of optimum physical and chemical properties, concentrations of about 0.5 to 1.0 weight percent of potassium persulfate or sodium persulfate have been found particularly advantageous.

Finally it is essential to have present in the reaction mixture a modifier such as an aliphatic mercaptan having at least four and preferably eight to eighteen carbon atoms per molecule. A particularly effective modifier was found in Lorol mercaptan, a commercial mixture of primary mercaptans derived from the corresponding mixture of alcohols of cocoanut oil origin. This commercial mercaptan mixture was found to have the following composition as determined by distillation at 5 mm. Hg:

| Mercaptan Fraction | Boiling Range (° C.) | Percent by Volume |
| --- | --- | --- |
| $C_{10}$ and lower | 77–120 | 3.5– 4 |
| $C_{12}$ | 122–123 | 58.5–60.5 |
| $C_{14}$ | 146–148 | 25 –22.5 |
| $C_{16}$ | 170–172 | 9 – 8 |
| $C_{18}$ and higher | 190–192 | 2.5– 2 |

From the above analysis it will be seen that the mercaptan mixture consists essentially of a major proportion of lauryl mercaptan ($C_{12}$) and a minor proportion of tetradecyl mercaptan ($C_{14}$). Accordingly, whenever a mixture of primary $C_{12}$ to $C_{14}$ mercaptans is referred to in the subsequent description and claims, it will be understood that the more complex mixture defined above is included within the term used. However, other primary mercaptans such as butyl, hexyl, heptyl, and so forth, through octadecyl mercaptan, are also useful, as are the tertiary mercaptans. Among the latter, t-octyl mercaptan has been found to be especially desirable, being more effective than either t-heptyl or t-dodecyl mercaptans. The amount of mercaptans used should be between about 0.2 and 5 weight percent based on the monomers but the preferred amount necessarily depends on several factors, i. e. nitrile content of feed, type and amount of emulsifier and modifier, relative acidity of aqueous phase, reaction temperature, and final properties desired.

The presence of such mercaptan modifiers accelerates the reaction rate and stabilizes the resulting latex so that the reaction mixture is preserved in the reactor as a stable and homogeneous dispersion. This permits the eventual addition of such materials as stabilizers and other ingredients to the vented latex in such a fashion that the added ingredients become uniformly dispersed therein prior to coagulation and subsequent polymer finishing operations, whereby the uniformity and general quality of the product is improved significantly.

After the aqueous and polymerizable portions and the modifier of the charge have been admixed in the reaction vessel, vapors of the volatile ingredients are allowed to escape for a few minutes in order to flush the system free of oxygen. The reaction vessel is then sealed and placed on a shaking or agitating device either in a constant temperature bath or in an electrical heating jacket. The reaction mixture is then maintained at temperatures of 25–70° C. for a period of time ranging from 5 to 150 hours. Usually, polymerizations have been carried out at about 40° C. to 60° C. for a period of 10 to 24 hours to give yields of 50 to 95% on the monomers as illustrated in subsequent examples. Alternatively the well-known redox-type polymerization recipe may be adapted for the present synthesis and the activated reaction can be run at temperatures as low as −10° C., if necessary adding a water-soluble alcohol, glycol or other anti-freezing agent to the aqueous medium to prevent its freezing.

At the end of the polymerization the reactor is removed from the agitating device, vented and the latex poured into a receiver. A short stop agent such as hydroquinone, hydroxylamine hydrochloride and/or other customary processing ingredients such as anti-oxidants may then be added to the latex and coagulation effected in a known manner by means of sodium chloride brine and/or alcohol or the like. The resulting coagulated resinous polymer is then in the form of fine crumbs which can be washed with water to remove the emulsifier, water-soluble catalyst, etc. and the purified polymer can then be dried in any suitable known manner, e. g. on trays, in an oven or on a hot mill, prior to further operations.

The following examples further illustrate the polymers useful in connection with the present invention.

EXAMPLE 1

A polymer was prepared in a glass-lined one-liter reactor from the following emulsifier charge:

50 grams acrylonitrile
30 grams isobutylene
20 grams butadiene
0.85 gram Lorol mercaptan
180 grams water
4 grams sodium lauryl sulfate
0.75 gram potassium persulfate The polymerization was carried out by mounting the sealed reactor on a revolving wheel in a constant temperature bath at 50° C. and maintaining the reactor in the bath for 18 hours under a state of agitation. Thereafter the reactor was cooled to room temperature, its content of latex which was entirely gel-free, poured into a 2-liter beaker and coagulated in fine crumb form by addition of sodium chloride brine. After washing and drying, 73 grams of a resinous polymer containing about 56% of combined acrylonitrile were recovered.

The dry polymer was milled for a few minutes at 95° C. and a smooth, flexible sheet of 0.020 inch thickness was stripped from the mill rolls. A section of the sheeted polymer was exposed to ultra violet light in a Fadometer at 82° C. for 200 hours without evident discoloration at the end of this aging test. Micro-dumbbells cut from the original sheet and its aged section respectively were evaluated on an X-5 Scott tester and found to have the following tensile properties:

|  | Original | Aged |
|---|---|---|
| Tensile Strength at Break, lbs./sq. in | 1,350 | 1,500 |
| Ultimate Elongation, Percent | 400 | 350 |

The above data and observations indicate that the novel tripolymer is extremely resistant to the deleterious effects usually encountered during light aging of unsaturated polymers.

EXAMPLE 2

The effect of different monomer feed compositions on the properties of the resulting products was determined in a series of runs employing the identical polymerization recipe and conditions as those described in Example 1, except that the proportions of the several monomeric ingredients were varied as indicated in Table I.

TABLE I

*Composition and properties of tripolymers of acrylonitrile, butadiene and isobutylene*

| Run No. | Monomer feed composition (Percent) | | | Polymer composition (Percent) | | | Raw stock properties (B) | | | Appearance |
|---|---|---|---|---|---|---|---|---|---|---|
| | Acrylo-nitrile | Buta-diene | Iso-butylene | Acrylo-nitrile | Buta-diene | Iso-butylene | Yield (A) | Tensile (p.s.i.) | Elongation (Percent) | |
| 1 | 60 | 20 | 20 | 59.0 | 23.0 | 18.0 | 86 | 2,285 | 260 | Very hard, flexible, smooth. |
| 2 (C) | 50 | 20 | 30 | 56.4 | 27.4 | 16.2 | 73 | 1,340 | 400 | Hard, flexible, smooth. |
| 3 | 45 | 25 | 30 | 54.0 | 35.0 | 11.0 | 71 | 1,180 | 450 | Do. |
| 4 (D) | 45 | 20 | 35 | 55.5 | 29.4 | 15.1 | 68 | 1,430 | 380 | Do. |
| 5 | 45 | 15 | 40 | 58.6 | 23.4 | 18.0 | 64 | 2,320 | 280 | Hard, brittle, smooth. |
| 6 | 40 | 20 | 40 | 54.2 | 34.8 | 10.0 | 58 | 1,660 | 385 | Hard, flexible, smooth. |
| 7 | 35 | 25 | 40 | 48.0 | 40.0 | 12.0 | 63 | 390 | 935 | Soft, very flexible, rough. |
| 8 | 35 | 20 | 45 | 52.8 | 39.2 | 8.0 | 47 | 895 | 460 | Fairly hard, flexible, smooth. |
| 9 | 30 | 20 | 50 | 47.4 | 49.1 | 3.5 | 38 | 410 | 610 | Fairly soft, flexible, smooth. |
| 10 | 30 | 30 | 40 | 46.0 | 52.0 | 2.0 | 55 | 75 | 625 | Soft, rubbery, very rough. |
| 11 | 25 | 15 | 60 | 51.2 | 36.2 | 12.6 | 41 | 1,205 | 335 | Fairly hard, flexible, smooth. |

(A) Percent conversion of monomers after 18 hours at 50° C.
(B) Measured on mill sheeted stocks, 0.020″ thickness.
(C) Same as example 1.
(D) Same as example 3.

It can be seen from the above table that the tensile properties of the new tripolymers can be varied considerably by appropriate changes of monomer feed composition. In general the data indicate that, everything else being equal, an increase in diolefin content tends to yield polymers of increased extensibility and decreased tensile strength, while an increase in nitrile results in increased yields and an increase in alkene results in decreased yields.

EXAMPLE 3

A tripolymer was prepared by polymerizing a mixture of 400 grams of butadiene, 700 grams of isobutylene and 900 grams of acrylonitrile at 45° C. emulsified in 3600 grams of water in a 3-gallon turbomixer in the presence of 20 grams of Lorol mercaptan, 80 grams of sodium lauryl sulfate and 15 grams of potassium persulfate. Fourteen hundred grams of polymer containing about 55% combined acrylonitrile were recovered after a reaction time of 11 hours by first adding to the latex (based on the initial monomer weight) 4 g. of hydroxylamine short stop and 5 g. of 2,6 di-t-butyl-p-cresol anti-oxidant, stripping the unreacted monomers from the latex product and thereafter coagulating, washing and drying the resinous polymer.

Portions of the dry polymer were compounded and cured at 142° C. for various times in an electrically heated press. Data for several types of compounds cured for ten minutes are given in Table II.

TABLE II

| Compound | A | B | C | D | E |
|---|---|---|---|---|---|
| Polymer | 100 | 100 | 100 | 100 | 100 |
| Zinc Oxide | | 5 | | 5 | 5 |
| Stearic Acid | | 0.5 | 0.5 | 0.5 | 0.5 |
| Tuads | | | 1.0 | 1.0 | |
| Captax | | | | | 1.0 |
| Sulfur | | | 1.0 | 1.0 | 1.0 |
| Cured 10 minutes at 142° C.: | | | | | |
| Tensile, lbs./sq. in | 1,550 | 1,635 | 2,015 | 2,945 | 1,950 |
| Modulus at 200% elongation, lbs./sq. in | 520 | 600 | 780 | 1,535 | 710 |
| Percent Elongation | 515 | 505 | 425 | 350 | 455 |

In all of the above cases the sheets pressed at elevated temperature, with or without additional curing and compounding ingredients, were smooth and flexible and were characterized by good physical properties. Moreover, the above data show that a substantial increase in strength and elongation of the novel plastics can be obtained by subjecting them to a vulcanization process in the presence of about 0.3 to 3 percent of sulfur.

EXAMPLE 4

In another series of tests a portion of the stabilized raw polymer of Example 3 was milled at 82° C. and sheeted off the mill at this temperature to give a smooth, flexible sheet about 0.020 inch thick. Portions of this sheeted material were used for aging tests, and physical properties of aged and unaged specimens were determined for purposes of comparison.

TABLE III

| Specimen | Description of Specimen | Tensile (p. s. i.) | Elongation (percent) |
|---|---|---|---|
| A | Original Sheeted Stock | 1,800 | 565 |
| B | Stock aged 20 days at 60° C | 2,610 | 465 |
| C | Stock aged 27 days at 60° C | 2,785 | 450 |
| D | Stock aged 17 days at 85° C | 2,805 | 430 |
| E | Stock aged 3 days at 125° C | 1,755 | 200 |
| F | Stock aged 7 days at 125° C | 2,555 | 50 |
| G | Stock Fadometer Aged 315 Hrs | 1,250 | 175 |
| H | Stock Roof aged 27 days | 2,185 | 435 |

These data indicate that the polymer, which contained only about 0.3% of 2,6 di-t-butyl-p-cresol as the anti-oxidant, possessed excellent heat aging resistance as well as good stability in natural sunlight and ultra-violet light.

In all the tests the samples showed no appreciable color change and retained their physical properties to a large extent, except in the very severe 7-day 125° C. test wherein the sample stiffened up very noticeably.

EXAMPLE 5

Another tripolymer was prepared by a 10-hour polymerization at 45° C. using the following charge:

|  | Grams |
|---|---|
| Acrylonitrile | 900 |
| Isobutylene | 750 |
| Butadiene | 350 |
| Sodium lauryl sulfate | 83 |
| Sodium bicarbonate | 6.0 |
| Potassium persulfate | 15.0 |
| Lorol mercaptan | 21.0 |
| Water | 4000.0 |

The latex was short-stopped with 0.2% hydroxylamine and 0.25% of the dibutyl cresol mentioned above. The amounts of short-stopping agents added are based on total weight of monomers.

The final polymer weighed 1380 grams and by analysis contained 14.90% nitrogen or 56.5% acrylonitrile.

The polymer banded readily and milled easily at mill roll temperatures of 85° C. Stock sheeted from the mill rolls after 2 minutes milling time (0.020 in. thickness) had a tensile strength of 2380 p. s. i. and an elongation of 400%. The same stock after 35 minutes milling at 88° C. had a tensile strength of 2595 p. s. i. and an elongation of 435%. These data illustrate that the polymer is resistant to degradation resulting from shearing forces and elevated temperatures.

The polymer was extruded through a #½ Royle extruder at 93° C. and at 80 R. P. M. through a die having a 0.400 inch outside diameter and a 0.300 inch inside diameter, and gave a smooth flexible tubing.

EXAMPLE 6

Because of their unusual resistance to organic solvents, the tripolymers are of interest as a material for packaging foods such as cheese, lard, meat or fruit; for tubing, linings, upholstery, artificial leather and other uses where resistance to a wide variety of solvents is desirable in addition to heat and light resistance. Their use as a packaging material is particularly advantageous because of their heat sealing properties. The resistance of the novel type of polymer to various solvents is illustrated in Table IV. The data summarized therein were obtained by immersing small pieces of the sheeted polymer in the various listed solvents at room temperature and observing the immersed samples at the end of 48 hours.

The solubility tests indicate that the present tripolymers are insoluble in all types of solvents tried and only swell when immersed in some of the more specific solvents such as ketones, aromatic compounds or nitroparaffins. This extremely high degree of insolubility is quite

TABLE IV

| Type of Solvent | Solvent | Comments |
|---|---|---|
| Aromatic hydrocarbon | benzene | slightly swollen.[1] |
| Nitroparaffin | nitromethane | highly swollen.[1] |
| Alcohol | isopropanol | insoluble. |
| Ether | ethyl ether | Do. |
| Ester | ethyl acetate | Do. |
| Paraffinic hydrocarbon | n-heptane | Do. |
| Poplar organic solvent | dimethylformamide | highly swollen.[1] |
| Ketone | methyl ethyl ketone | swollen.[1] |
| Chlorinated | ethylene dichloride | highly swollen.[1] |
| Do | carbon tetrachloride | insoluble. |
| Sulfur containing solvent | carbon disulfide | Do. |
| Phenolic | p-cresol | highly swollen.[1] |
| Water |  | insoluble. |
| Alkali | 10% NaOH, aqueous Solution | Do. |
| Acid | 10% H₂SO₄, aqueous Solution | Do. |

[1] Pieces of polymer swelled but maintained their original shape. No evidence of solubilization.

astonishing since copolymers prepared from any two of the monomeric constituents presently used are readily soluble in properly chosen solvents. Thus, butadiene-isobutylene copolymers are soluble in benzene, butadiene-acrylonitrile copolymers are soluble both in benzene and in methyl ethyl ketone and acrylonitrile-isobutylene resins are soluble in nitroparaffins and in dimethyl formamide. The insolubilizing effect of the diolefin in the present plastics is of unexpected advantage in making the latter available as a flexible material resistant to virtually any solvent known.

Incidentally, the lack of any suitable solvent for the novel plastics has prevented the determination of their molecular weight and unsaturation, and the lack of information on the latter point made it necessary to determine the combined diolefin content of the plastic from a material balance, analyzing for residual diolefin in the unreacted monomers at the end of each run. Repeated tests have shown that the diolefin content can be determined accurately in this fashion.

EXAMPLE 7

Portions of the raw stock of Example 5 were calendered at temperatures between 80 and 95° C. to give clear transparent sheets. In order to facilitate this type of operation about 0.1 to 1% weight percent, preferably 0.2 to 0.5 weight percent of stearic acid was mixed into the stock. In each instance, the calendered film stock could be sealed tightly by application of slight pressure to the hot sheets, but the latter were entirely free from tack at temperatures below about 75° C. The sheets were strong and self-supporting, suitable for packaging as suggested hereinbefore. Furthermore, when calendered onto paper a strong paper-polymer bond was formed, thereby permitting the preparation of oil-, grease- and solvent-resistant paper of high tensile and tear strength.

EXAMPLE 8

Latices of acrylonitrile-butadiene-isobutylene tripolymers were also prepared in order to evaluate the usefulness of the polymers as paper impregnating or paper coating materials. In all cases polymerizations were carried out for 18 hours at 45° C. using the recipe:

| | Grams |
|---|---|
| Acrylonitrile | 90 |
| Butadiene | 40 |
| Isobutylene | 70 |
| Emulsifier (as stated) | 9 |
| Potassium persulfate | 1.5 |
| Lorol mercaptan | 1.7 |
| Water | 315.0 |

| Run No | A | B | C |
|---|---|---|---|
| Emulsifier | Sodium Lauryl Sulfate | Ammonium Oleate | Sodium Dresinate[1] |
| Percent Polymer Solids in Stripped Latex | 31.2 | 27.2 | 33.7 |
| Percent Conversion | 67 | 57 | 58 |

[1] Essentially sodium abietate.

These results illustrate the favorable effect of the preferred type of emulsifier on polymer yield, though the subsequent evaluation shows that the polymers from runs B+C are qualitatively similar to the product of run A.

Coarse filter paper was impregnated with each of the above latices by immersing the paper for one-half minute and then drying the impregnated paper for 10 minutes at 80° C. The dried papers were evaluated for both tensile and tear strength and compared with the original untreated paper. Tensile strengths were run on 1" x 6" strips (0.007" thickness) which were pulled at 2" per minute or approximately 1.22 lbs./sec. The data given in the following table represent the average of 4 or 5 measurements.

Tear strength was measured with an Elmendorf tear apparatus and data are reported in terms of grams/sheet. In each test three 1.5" x 2" sheets were torn simultaneously and two such tests were run on each type of paper. The data follow:

TABLE V

| | Tensile Strength | | Elmendorf Tear Strength, gms./sheet |
|---|---|---|---|
| | lbs./in. | lbs./in.² | |
| Untreated Paper | 6.3 | 905 | 45.5 |
| Paper Treated with Latex No.: | | | |
| A | 29.7 | 3,850 | 84.8 |
| B | 15.3 | 2,190 | 107.8 |
| C | 23.7 | 3,410 | 84.8 |

These data illustrate the usefulness of the tripolymers as paper impregnating agents.

The same latices were used to coat hard, smooth paper to give a flexible, oil-resistant product. In these experiments a thin coating of latex was spread over the paper after which the paper was dried for 10 minutes at 80° C. As many coats could be laid down as desired. Papers with three such coats were used as containers for oleic acid and did not show penetration of the acid after 24 hours' contact time.

EXAMPLE 9

In further and large scale evaluation of tripolymers of the type described above, a polymer was employed whose composition was determined to be 56.6% acrylonitrile, 25.4% butadiene, and 18.1% isobutylene. The polymer was prepared in the same manner as polymers described in previous sections and the final product contained 0.28% di-t-butyl-p-cresol as a stabilizing agent.

Portions of this polymer were molded or cured as 6" x 6" slabs and these slabs were used in obtaining the data presented in the following table:

TABLE VI

| Stock No | 1 | 2 | 3 |
|---|---|---|---|
| Polymer (parts) | 100 | 100 | 100 |
| TiO₂ (parts) | | 7.3 | 7.3 |
| ZnO (parts) | | 5.0 | 5.0 |
| Stearic Acid (parts) | | 0.5 | 0.5 |
| Tuads (parts) | | 1.0 | 1.0 |
| Sulfur (parts) | | 1.0 | 1.0 |
| Phenyl-beta-naphthylamine | | | 1.0 |
| Cure at 141° C., min | 10 | 15 | 15 |
| Properties of unaged, but pressed or cured stocks: | | | |
| Tensile (p. s. i.) | 1,463 | 2,390 | 2,300 |
| Modulus, 200% | 1,082 | 1,730 | 1,760 |
| Elongation (percent) | 455 | 350 | 330 |
| Bell Telephone Brittleness Test (° C.)— | | | |
| Passed | 0 | 0 | 0 |
| Failed | −7 | −7 | −7 |
| Tinius Olsen Stiffness Test, lb./in.²— | | | |
| 30° C | 4,440 | 6,990 | 6,600 |
| 7° C | 32,900 | 64,100 | 56,300 |
| Properties of cured stocks after 3 days' aging at 120° C.: | | | |
| Tensile (p. s. i.) | 1,570 | 2,265 | 2,230 |
| Modulus, 200% | 1,395 | 2,225 | 2,250 |
| Elongation (percent) | 285 | 200 | 195 |
| Properties of cured stocks after 7 days' aging at 120° C.: | | | |
| Tensile (p. s. i.) | 1,635 | 2,720 | 2,480 |
| Elongation (percent) | 140 | 85 | 80 |
| Tinius-Olsen Stiffness [1] 30° C | 3,060 | 25,500 | 18,780 |

[1] Measure of the force required to bend a strip of polymer 1" wide and about 0.075" thick through an angle of 30°.

These data demonstrate that both the cured and uncured stocks possess good physical properties and that these properties are retained in the stocks after prolonged aging at elevated temperatures. The brittleness test data indicate that the polymers are flexible at temperatures as low as 0° C. and therefore the polymers should be useful as packaging materials where temperatures lower than −6° C. will not be encountered. The Tinius-Olsen data show that the stocks have not stiffened appreciably even after aging for 7 days at 20° C.

The three stocks described above were Fadometer aged for 200 hours. Stocks 1 and 2 showed scarcely any discoloration during this period of light aging, whereas Stock 3 became noticeably darker. Inspection of the physical data given in the preceding table indicate that no additional stability is obtained by incorporating an antioxidant such as phenyl-beta-naphthylamine into the previously stabilized polymer, but on the contrary the amine-type anti-oxidant merely causes discoloration of the product on exposure. At the same time it is to be pointed out, however, that the incorporation of some anti-oxidant into the polymer after its synthesis is highly desirable. This is illustrated in the subsequent example.

ner to the polymer isolated from the latex described as part B2.

The above results indicate that it is desirable to add to the novel polymers about 0.1 to 1%, preferably 0.2 to 0.5% of an antioxidant soon after the polymer is prepared. The preferred anti-oxidants are polyalkylated phenols such as the di-t-butyl or di-t-amyl cresol, the particular advantage of these anti-oxidants being their non-staining character. However, where discoloration of the product is unimportant, as in pigmented compounds, any other anti-oxidant used for stabilizing diolefinic rubbers can be employed. For example, arylamines such as phenyl-beta - naphthylamine, phenyl-alpha-naphthylamine, diphenyl-p-phenylene diamine, aldol-alpha-naphthylamine, arylamine-ketone or arylamine-ketone-aldehyde reaction products, glycerol esters of salicyclic acid, hexachlornaphthalene, alkylated phenol sulfides, hydroquinone compounds such as diamyl hydroquinone or monobutyl ether of hydroquinone and other known anti-oxidants give satisfactory results.

EXAMPLE 11

The usefulness of the novel polymers as plasticizers for resins is illustrated by the following data.

TABLE VII
*Evaluation of acrylonitrile-butadiene-isobutylene tripolymers as vinylite plasticizing agent*

COMPOUNDING RECIPE

| | Parts |
|---|---|
| Vinylite VYNW | 100 |
| Basic lead carbonate | 3 |
| Stearic acid | 1.5 |
| Polymer 1 | 50 |
| Di-2-ethyl hexyl phthalate | 50 |

| Polymer used in blend | 1 | 2 | 3 | 4 | 5 | 6 | 7 | 8 | Perbunan-35 |
|---|---|---|---|---|---|---|---|---|---|
| Original Properties of Blends: | | | | | | | | | |
| Tensile (p. s. i.) | 2,645 | 2,780 | 2,590 | 2,605 | 2,525 | 2,715 | 2,270 | 2,395 | 1,710. |
| Elongation (Percent) | 215 | 235 | 295 | 255 | 225 | 265 | 320 | 300 | 350. |
| Extrusion of Blends (280° F., 80 R. P. M., 0.400" die): | | | | | | | | | |
| In./Min | 80.5 | 84.0 | 100.5 | 92 | 89.5 | 95.5 | 82.0 | 96.0 | 70. |
| Gm./in | 1.70 | 1.63 | 1.76 | 1.70 | 1.60 | 1.69 | 1.58 | 1.57 | 1.97. |
| Crescent Tear of Blends at Room Temp., Lb./In | 567 | 490 | 420 | 590 | 587 | 510 | 305 | 390 | 250. |
| Properties of Blends after 3 days' Aging at 250° F.: | | | | | | | | | |
| Tensile (p. s. i.) | 3,750 | 3,480 | 3,320 | 3,680 | 3,830 | 3,610 | 2,510 | 2,980 | 1,100. |
| Elongation (Percent) | 100 | 90 | 100 | 110 | 100 | 90 | 90 | 100 | 75. |
| Discoloration of Blends after 200 Hours' Fadometer Exposure | Slight | Slight | Slight | Slight | Slight | Slight | Slight | Slight | Severe. |

¹ Identified in Table VII by reference to appropriate run number appearing in Table I.

EXAMPLE 10

A latex prepared under the same conditions as given in Example 1 above was first divided into two equal parts, parts A and B. Part A was coagulated, mill washed, and mill dried without the addition of either shortstopping agent or antioxidant. The polymer was tough and could not be sheeted out as a smooth, flexible sheet. Part B was shortstopped with 0.2% hydroxylamine (on the polymer content of the latex) and divided into three parts. Part B1 was coagulated, washed, and dried and like part A could not be sheeted out to give smooth, flexible sheets of polymer. To part B2 was added 0.25% 2,6 di-t-butyl-p-cresol (on dry polymer) and the polymer was then coagulated, washed, and dried. This polymer milled very easily at 150° F. forming a smooth band on the mill rolls with a rolling bank and sheeting off as a very smooth, flexible sheet. Part B3 was stabilized with 0.25% heptylated diphenylamine (on dry polymer) and the dry polymer behaved in the same favorable man- A commercial resinous copolymer of 95% vinyl chloride and 5% vinyl acetate (Vinylite VYNW) was blended with several of the novel tripolymers and conventional compounding ingredients as shown in Table VII, and the properties of these blends were compared with those of a similar blend of the vinyl chloride resin with a commercial rubbery copolymer of about 65% butadiene and 35% acrylonitrile (Penbunan-35).

From the table it can be seen that the novel tripolymers are surprisingly effective as plasticizers for vinyl resins, being quite superior to the rubbery butadiene-nitrile copolymers. The results show that the blends containing the novel tripolymers have substantially greater tensile and exceptionally good tear strength, are somewhat less extensible than blends containing the rubbery copolymer, are markedly easier to extrude and at the same time show less elastic swell when extruded as indicated by the grams-per-inch values. The tear strength of blend Number 4, containing the tripolymer described in run 4 of Table I, is particularly outstanding. Furthermore, the data show that the blends containing the novel tripolymers are more resistant both to heat and to ultraviolet light. In general the resins plasticized with 15 to 200 parts, preferably 25 to 75 parts of the novel tripolymers per 100 parts of resin show many favorable properties, including good flexibility at temperatures as low as −20° F., the good results undoubtedly being due both to the excellent compatibility of the polymers with the resins and to the low unsaturation of the novel polymers.

The present tripolymers may be blended with various fillers or pigments such as zinc oxide, titanium oxide, clay, aluminum powder, calcium carbonate or carbon black and these blends can be molded, extruded or sheeted to give strong flexible products. Furthermore, while sufficiently soft for most purposes, the novel tripolymers or blends thereof with other plastics may be further softened by the addition of esters such as dioctyl phthalate, tricresyl phosphate, or the like.

It will be understood from the foregoing description of the invention and particularly from the illustrations of the unusual effectiveness of the tripolymers as plasticizers for vinyl resins, that numerous variations are possible without departing from the spirit of this invention or from the scope of the appended claims.

We claim:

1. A composition of matter comprising a resinous vinyl chloride polymer and, blended therewith, a flexible, oil-resistant, resinous, thermoplastic tripolymer of 5 to 25 weight percent of combined isobutylene, 20 to 40 weight percent of a combined conjugated $C_4$ to $C_6$ diolefin and 45 to 60 weight percent of a combined nitrile selected from the group consisting of acrylonitrile methacrylonitrile and chloracrylonitrile.

2. A composition of matter comprising 100 parts of a resinous copolymer of vinyl chloride and vinyl acetate and, as a plasticizer therefor, 15 to 200 parts of a flexible, oil-resistant, resinous, thermoplastic tripolymer consisting of 5 to 25 weight percent of combined isobutylene, 20 to 40 weight percent of a combined conjugated $C_4$ to $C_6$ diolefin and 45 to 60 weight percent of combined acrylonitrile.

3. A composition of matter comprising 100 parts of a resinous copolymer of 85 to 95 weight percent of vinyl chloride and 15 to 5 weight percent of vinyl acetate and, as a plasticizer therefor, 25 to 75 parts of a flexible, oil-resistant, resinous, thermoplastic tripolymer consisting of 5 to 25 weight percent of combined isobutylene, 20 to 40 weight percent of combined butadiene-1,3 and 45 to 60 weight percent of combined acrylonitrile.

4. A composition of matter comprising 100 parts of a resinous copolymer of about 95 weight percent of vinyl chloride and 5 weight percent of vinyl acetate; about 50 parts of a flexible, oil-resistant, resinous, thermoplastic tripolymer of about 15 weight percent of combined isobutylene, about 30 weight percent of combined butadiene-1,3 and about 55 weight percent of combined acrylonitrile; about 50 parts of di-2-ethylhexyl phthalate; about 3 parts of basic lead carbonate; and about 1.5 parts of stearic acid.

FRED W. BANES.
DAVID W. YOUNG.
ALTA J. HUND.

References Cited in the file of this patent

UNITED STATES PATENTS

| Number | Name | Date |
|---|---|---|
| 2,459,126 | Clifford | Jan. 11, 1949 |
| 2,537,626 | Eberly et al. | Jan. 9, 1951 |

OTHER REFERENCES

Young et al., Industrial and Eng. Chem., Nov. 1947, pgs. 1446–1452.